United States Patent
Jessamy

(10) Patent No.: US 10,280,893 B2
(45) Date of Patent: May 7, 2019

(54) HYDROELECTRIC SYSTEM AND METHOD

(71) Applicant: Frederick J. Jessamy, Miramar, FL (US)

(72) Inventor: Frederick J. Jessamy, Miramar, FL (US)

(*) Notice: Subject to any disclaimer, the term of this patent is extended or adjusted under 35 U.S.C. 154(b) by 0 days.

(21) Appl. No.: 15/988,773

(22) Filed: May 24, 2018

(65) Prior Publication Data

US 2018/0266384 A1    Sep. 20, 2018

Related U.S. Application Data

(63) Continuation-in-part of application No. 15/493,607, filed on Apr. 21, 2017, now abandoned, which is a continuation-in-part of application No. 14/779,528, filed as application No. PCT/US2015/041045 on Jul. 19, 2015, now abandoned.

(60) Provisional application No. 62/058,430, filed on Oct. 1, 2014.

(51) Int. Cl.
| | |
|---|---|
| F03B 7/00 | (2006.01) |
| F03B 13/08 | (2006.01) |
| F03B 17/00 | (2006.01) |
| F03B 17/06 | (2006.01) |

(52) U.S. Cl.
CPC ............ *F03B 13/086* (2013.01); *F03B 17/00* (2013.01); *F03B 17/005* (2013.01); *F03B 17/062* (2013.01); *F03B 7/00* (2013.01); *Y02E 10/28* (2013.01)

(58) Field of Classification Search
USPC ...................................... 290/53, 54; 60/398
See application file for complete search history.

(56) References Cited

U.S. PATENT DOCUMENTS

| | | | | | |
|---|---|---|---|---|---|
| 299,127 | A | * | 5/1884 | Garrigus | F03D 1/04 415/2.1 |
| 4,117,676 | A | * | 10/1978 | Atencio | F03B 13/086 137/123 |
| 4,182,123 | A | * | 1/1980 | Ueda | F03B 13/086 137/123 |
| 4,241,283 | A | * | 12/1980 | Storer, Sr. | E02B 9/04 290/43 |
| 4,288,985 | A | * | 9/1981 | Dyck | F03B 13/086 137/132 |
| 4,364,228 | A | * | 12/1982 | Eller | F03B 13/08 137/143 |

(Continued)

OTHER PUBLICATIONS

Katherine C. Marshall, An Evaluation of the Water Lifting Limit of a Manually Operated Suction Pump: Model Estimation and Laboratory Assessment, Scholar Commons, University of South Florida; Oct. 2017; pp. i-vii and 1-94.

(Continued)

*Primary Examiner* — Pedro J Cuevas
(74) *Attorney, Agent, or Firm* — Pablo Meles; Espinosa Martinez, PL

(57) ABSTRACT

The present invention is a hydroelectric system having a siphon component, a generator component, and an electronics and control component, which produces an inflow of water caused by a vacuum initially created within the system and further aided by hydrostatic pressure. The inflow is directed to a ramp where it drives a water turbine located within the respective electrical generating system to produce electrical power.

20 Claims, 4 Drawing Sheets

(56) References Cited

U.S. PATENT DOCUMENTS

| | | | | |
|---|---|---|---|---|
| 4,443,707 A * | 4/1984 | Scieri | F03B 13/06 | 290/4 A |
| 4,476,396 A * | 10/1984 | Calvert, Jr. | F03B 13/08 | 290/42 |
| 4,540,313 A * | 9/1985 | Broome | E02B 9/00 | 290/52 |
| 4,629,904 A * | 12/1986 | Rojo, Jr. | F03B 13/086 | 290/1 R |
| 4,746,244 A * | 5/1988 | Broome | E02B 9/00 | 290/52 |
| 6,606,857 B1 * | 8/2003 | Simonds | F01C 21/089 | 290/54 |
| 8,058,741 B1 * | 11/2011 | Echemendia | F03B 7/00 | 290/53 |
| 8,196,396 B1 * | 6/2012 | Tseng | F03B 13/08 | 290/54 |
| 8,197,178 B1 * | 6/2012 | Chen | F03D 3/0427 | 415/4.1 |
| 8,591,178 B2 * | 11/2013 | DeMontmorency | F03B 13/08 | 415/121.2 |
| 8,740,576 B2 * | 6/2014 | Konnur | E03B 5/00 | 137/143 |
| 2009/0160192 A1 * | 6/2009 | Chen | F03B 17/005 | 290/54 |
| 2010/0207394 A1 * | 8/2010 | Leung | E02B 9/00 | 290/54 |
| 2012/0032444 A1 * | 2/2012 | Burton | F03B 13/145 | 290/53 |
| 2016/0348641 A1 * | 12/2016 | Jessamy | F03B 17/063 | |
| 2017/0234289 A1 * | 8/2017 | Franck | F03B 13/00 | 290/54 |
| 2017/0284360 A1 * | 10/2017 | Jessamy | F03B 13/22 | |

OTHER PUBLICATIONS

Posted by u/Anon2267 approximately Jun. 2018 on Reddit; Longest Straw You Can Drink From; printed Feb. 25, 2019; see p. 2.

Rob Ladolfi, Science Teacher, Washington, DC and Scott Wilber, President, ComScire—QuantumWorld Corporation, answering question #443 at https://www.physlink.com/education/askexperts/ae443.cfm; printed Feb. 25, 2019.

* cited by examiner

HYDROELECTRIC SYSTEM AND METHOD

CROSS-REFERENCE TO RELATED APPLICATIONS

This non-provisional patent application is a continuation-in-part of, and claims the benefit of, the currently pending U.S. Non-Provisional patent application Ser. No. 15/493,607, filed on Apr. 21, 2017, which is a continuation-in part of U.S. Non-Provisional patent application Ser. No. 14/779,528, filed on Sep. 23, 2015, currently abandoned, which is a National Stage Entry of PCT/US15/41045 filed on Jul. 19, 2015, currently pending, which claims priority from Provisional Application No. 62/058,430, filed on Oct. 1, 2014, currently expired, all of which are incorporated by reference as if fully set forth herein.

STATEMENT REGARDING FEDERALLY SPONSORED RESEARCH OR DEVELOPMENT

Not applicable.

FIELD OF THE INVENTION

The present disclosure generally relates to systems and methods for directing water flow to electrical generators. More particularly, the present disclosure relates to a hydroelectric system that takes advantage of pressure differentials in deep water to facilitate a water flow convertible to electrical energy.

BACKGROUND

Hydroelectric power generating systems are known in the art. Conventional systems utilize a natural geographical location, such as a valley, or the like, and place man-made structures such as a man-made dam across a flowing channel in a natural setting to create a reservoir upstream of the dam. The water is then forced to flow through one or more gates that are interconnected to power generating turbines in the powerhouse located within the dam to create electrical power.

Currently, in order to harness hydropower electricity a massive inflow of water created by a drop, or impact is used, to drive water turbines. These turbines gain momentum as a continuous inflow of water hits them. However, in order for this approach to function properly locations must be carefully chosen. In some instances, construction is difficult to perform due to terrain. Additionally, variations in water inflow rates created by seasonal changes and droughts can deter electrical production, resulting in financial losses and electrical scarcity. This results in limitations and restrictions as to where hydropower electric stations can be constructed.

Current hydropower electrical systems are located in regions where water flow is driven by gravity. Without gravity to produce water flow, these systems wouldn't have the capability to produce electrical energy. Accordingly, terrain gradients are another limiting factor where a hydropower electrical system can be introduced.

Accordingly, in order to overcome the above mentioned drawbacks, disadvantages and limitations of existing hydroelectric power generating systems, and the growing need for electrical energy in an increasingly growing society, there has been an ever-increasing demand for a new, efficient, ocean-driven hydropower electrical system. It would be highly desirable to provide such a system that integrates all of the necessary functions heretofore performed, without having any of the prior aforementioned drawbacks.

It would, therefore, be desirable to have an apparatus, system, and related method that can generate electricity from a water flow that is not driven by terrain gradients. Therefore, there currently exists a need in the art for an apparatus, system and related method that can generate electricity from a water flow, where this water flow is facilitated by the naturally occurring pressure differentials found in deep water, such as in the oceans.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

In this specification, where a document, act, or item of knowledge is referred to or discussed, this reference or discussion is not an admission that the document, act, or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY

The present disclosure is generally directed to a hydroelectric system which takes advantage of pressure differentials between the surface and floor of a body of water, such as the ocean. The overall system is comprised, generally, of a siphoning component, a generator component, and an electronics and control component. The siphoning component utilizes a sealable pipe with one end submerged in the water and the other end above the water surface.

The siphoning component further utilizes a pump to draw the air out of the pipe and/or drive any water already inside the pipe upwards. The same, or an additional, pump may be located below the water line to raise the water level within the pipe. These pumps, along with, and aided by, the hydrostatic pressure exerted by the water at depth, eventually causes the pipe to be filled with water. A one or more directional flow valve within the pipe prevents backflow and ensures that water flows out of the pipe and onto the generator component.

The generator component includes a sluice 121e (as shown in FIG. 4) or ramp structure, having a higher portion and a lower portion, that floats or otherwise remains above the surface of the water with the pipe outlet flow directed at the higher portion. A sluice is conventionally defined as an artificial passage for water (as in a millstream) fitted with a valve or gate for stopping or regulating flow or a body of water pent up behind a floodgate. The water then flows down the sluice and past a one or more turbine generator. The action of the water turning the turbines connected to electricity generators, generates power. This electrical energy may then be stored or transferred to another location through means as may be known in the art, such as batteries or power transmission cables.

The electronics and control component provides power to the one or more pump and is communicative with one or more flow sensors. As the flow sensors measure and detect the flow rate of the water exiting the pipe, the electronics and control component selectively opens and closes the pipe covers and powers the vacuum pump to maintain a preselected flow rate. The electronics and control component may also be configured to interface with additional sensors, gauges, or other components located within the system to collect data, analyze the data collected, and take action based upon the data.

These and other features, aspects, and advantages of the invention will be further understood and appreciated by those skilled in the art by reference to the following written specification, claims, and appended drawings.

BRIEF DESCRIPTION OF THE DRAWINGS

These and other features, aspects, and advantages of the present invention will become better understood with regard to the following description, appended claims, and accompanying drawings where:

Like reference numerals refer to like parts throughout the several views of the drawings.

Figure 1:
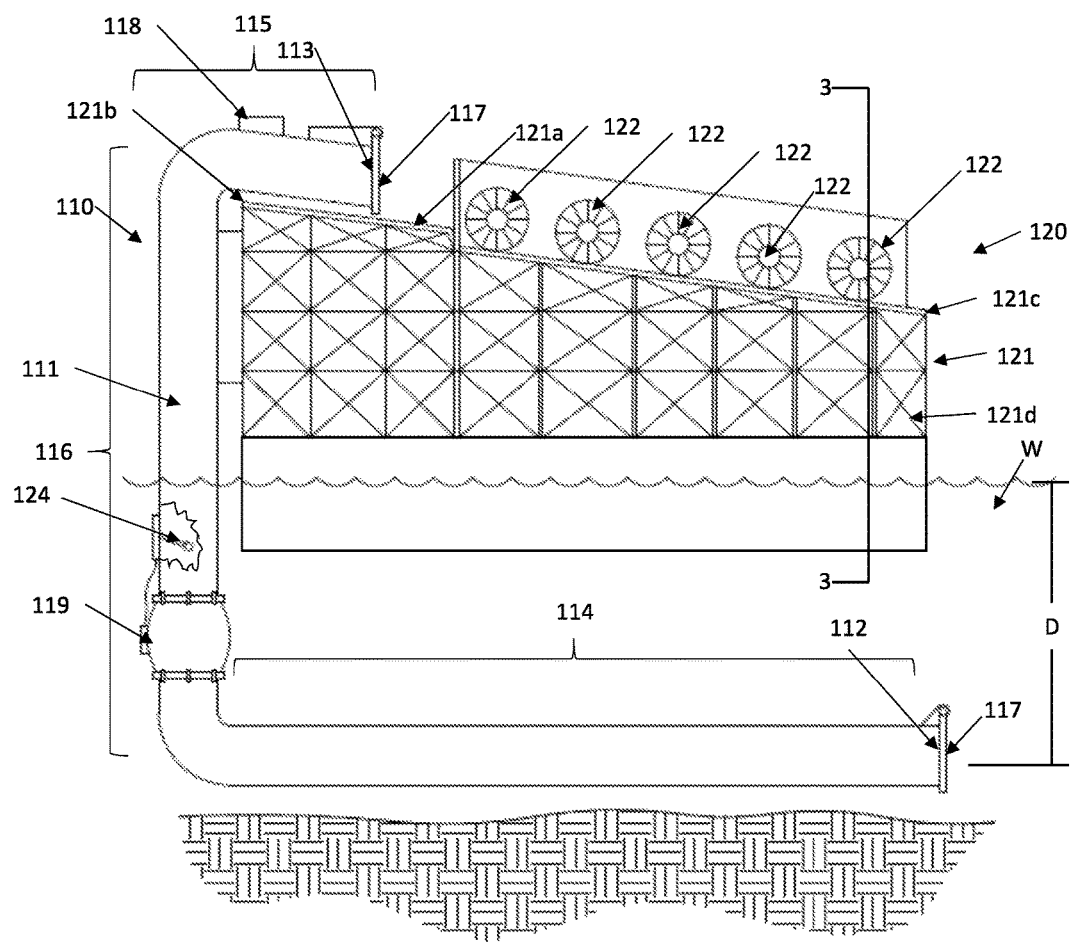
FIG. 1 presents a side view of an exemplary hydroelectric power generating system according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DESCRIPTION

In the Summary above and in the Description, and the Claims below, and in the accompanying Drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

While the specification concludes with claims defining the features of embodiments of the invention that are regarded as novel, it is believed that the invention will be better understood from a consideration of the following description in conjunction with the figures, in which like reference numerals are carried forward.

Apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Figure 2:
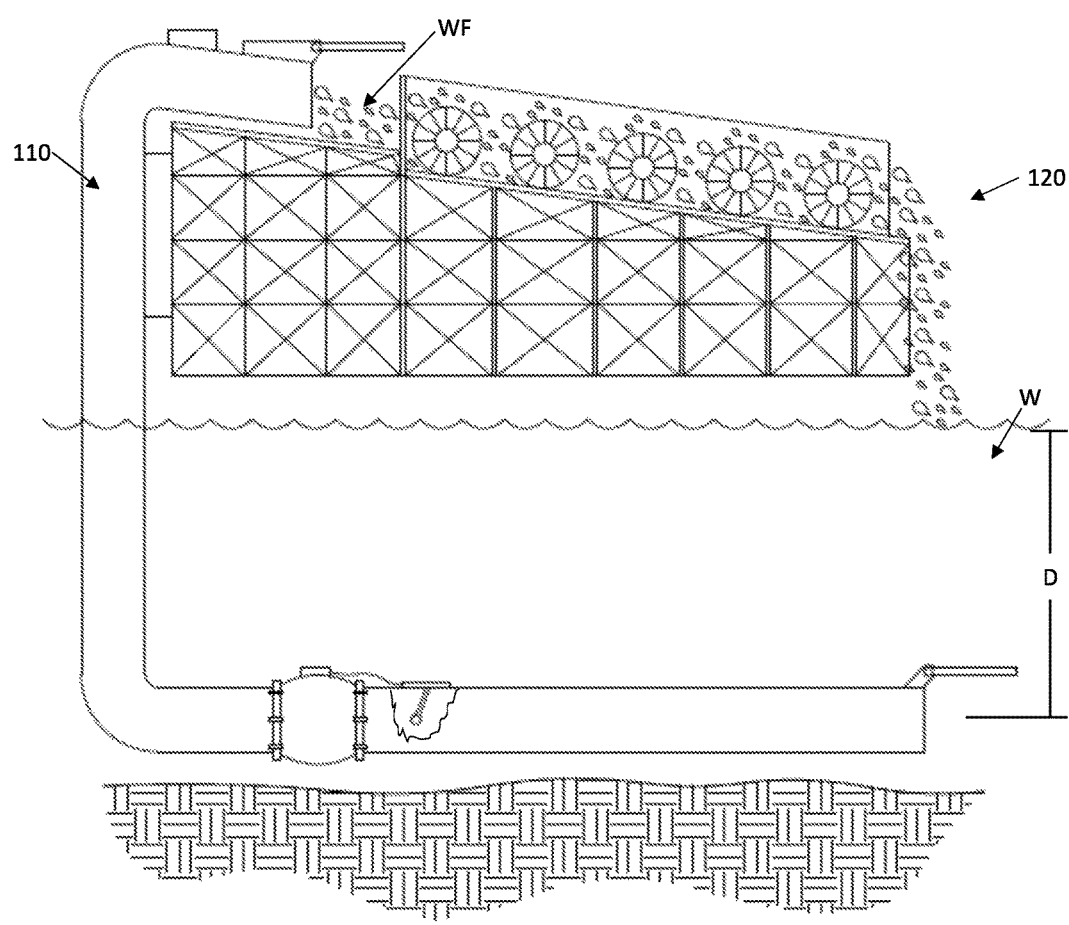
FIG. 2 presents a side view of an exemplary hydroelectric power generating system, wherein the system is illustrated showing a water flow driving the water turbines, according to an embodiment of the present invention.

Referring now to the figures in general, and FIG. 1 in particular, we discuss a preferred embodiment of the present invention. A hydroelectric system 100 includes a siphoning component 110, a generator component 120, and an electronics and control component 130 (not illustrated in the figure). In the preferred embodiment, the system operates in a body of water, such as the ocean, W, where the siphoning component 110 draws water up from a predetermined depth D and deposits the water WF onto the generator component 120, whereby, as illustrated in FIG. 2, the deposited water WF flows in communication with the generator component 120, thereby generating electrical energy. This electrical energy may then be stored or transmitted as desired according to methods or means as is known in the art. The water flow rate is monitored and regulated by the electronics and control component 130.

The Siphoning Component 110

The siphoning component 110 of the system is comprised of a pipe 111 with an inlet 112 and an outlet. The pipe 111, as shown in FIG. 1, is configured with a substantially horizontal portion 114 at the inlet 112, a downward angled outlet portion 115, and a vertical portion 116 extending between the horizontal portion 114 and the downward angled outlet portion 115. Each of the inlet 112 and outlet 113 are further comprised of covers 117. Each of these covers 117 is sealably communicative with their corresponding opening (either the respective inlet or outlet). Each cover is configured with opening and closing mechanism as may be known in the art, such as, but not limited to, electric motors, servos, pneumatic mechanisms, or hydraulic mechanisms. These opening and closing mechanisms are operatively communicative with the electronics and control component and are actuated (open or closed) by the electronics and control component 130. Embodiments of the covers may include flaps or doors (as illustrated in FIGS. 1 and 2). Further embodiments of the covers are contemplated to include other mechanical sealing devices such as rotatable ball valves, butterfly valves, gate valves, knife gate valves, or other mechanical sealing devices as may be known in the art.

Figure 4:
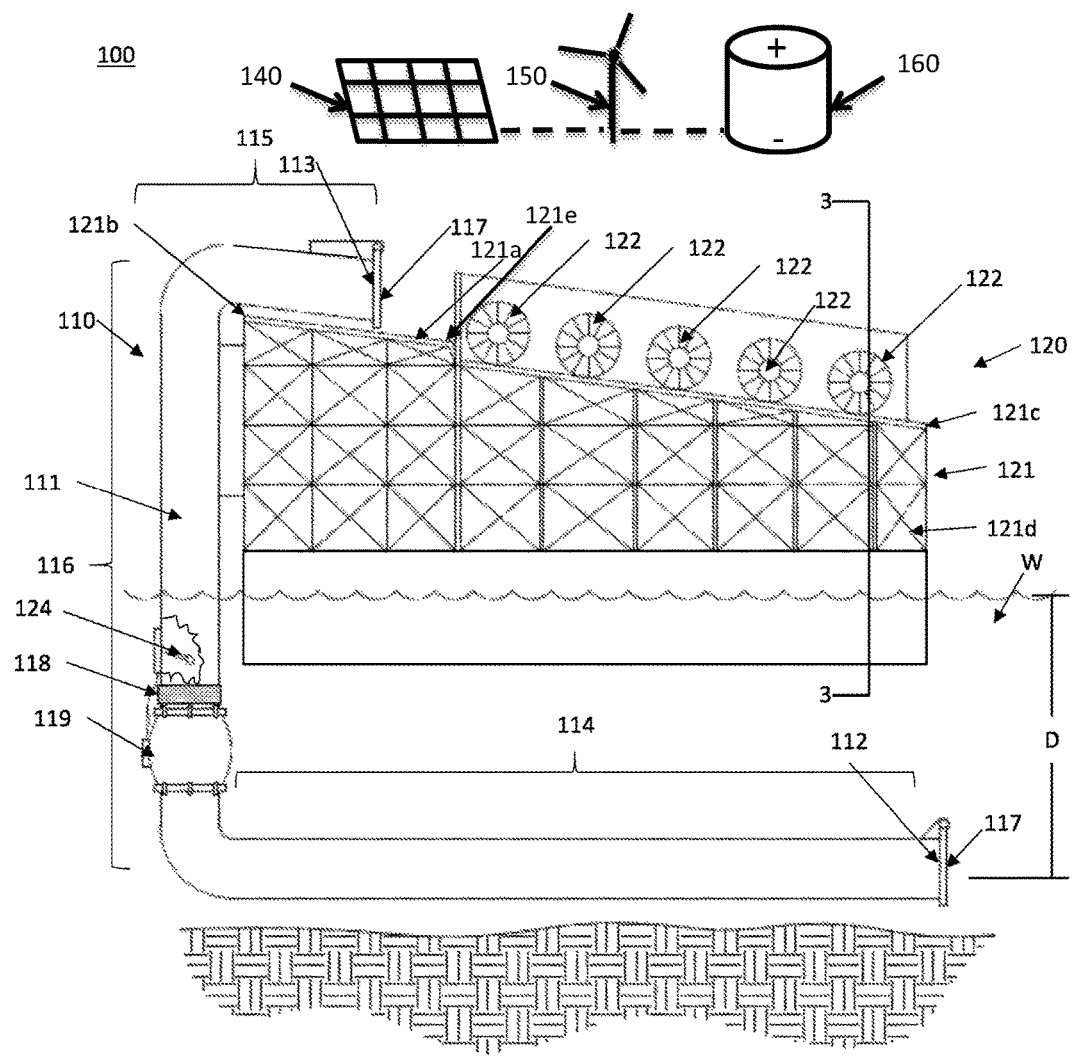
FIG. 4 presents a side view of an exemplary hydroelectric system according to another embodiment of the present invention.

Referring now to the embodiment shown in FIG. 4, the siphoning component 110 further comprises a pump 118 located near the outlet 113 of the pipe 111 and configured to create a vacuum inside of the pipe 111. In embodiments, the pump 118 may also be configured to draw water up the pipe, in addition to initially creating a vacuum. The pump 118 is sealably communicative with the pipe 111 interior and operatively communicative with the electronics and control component 130. The pump 118 receives power from the electronics and control component 130. In one embodiment, the pump 118 is configured as a water pump, as shown in FIG. 4, located below the water line. One or more flow rate sensors 124, as are known in the art, are disposed within the interior of the pipe 111. Each flow rate sensor 124 is configured to sense the rate of flow of water WF through the pipe 111 and is operatively communicative with the electronics and control component 130.

The siphoning component 110 further comprises a one or more one-way valve 119 disposed integral to the pipe 111 between the inlet 112 and the outlet 113. Each one-way valve 119 is positioned in-line to and communicative with the water flow inside the pipe 111 and is configured to prevent any backflow of water through the pipe.

The siphoning component 110 may further comprise sensors configured to take pressure readings and communicate the pressure readings to the electronics and control component 130. A first pressure sensor is configured to take a pressure reading of the water just outside of the inlet 112. This "inlet pressure" would reflect the pressure measurement at the lowest underwater depth of the siphoning component, preferably, just outside of the inlet cover. Another pressure is located near the outlet 115, and is configured to measure the pressure inside of the pipe 111 near the outlet, and communicate that pressure reading to the electronics and control component 130. The electronics and control component 130 is configured to receive the pressure readings from the two locations, compare them, and perform operation steps based upon the comparison. By way of example and not limitation, if the pressure outside the pipe at the inlet is higher than the pressure inside the pipe at the outlet, then the electronics and control component can issue a command to open the inlet cover and keep the outlet cover closed.

The Generator Component 120

Figure 3:
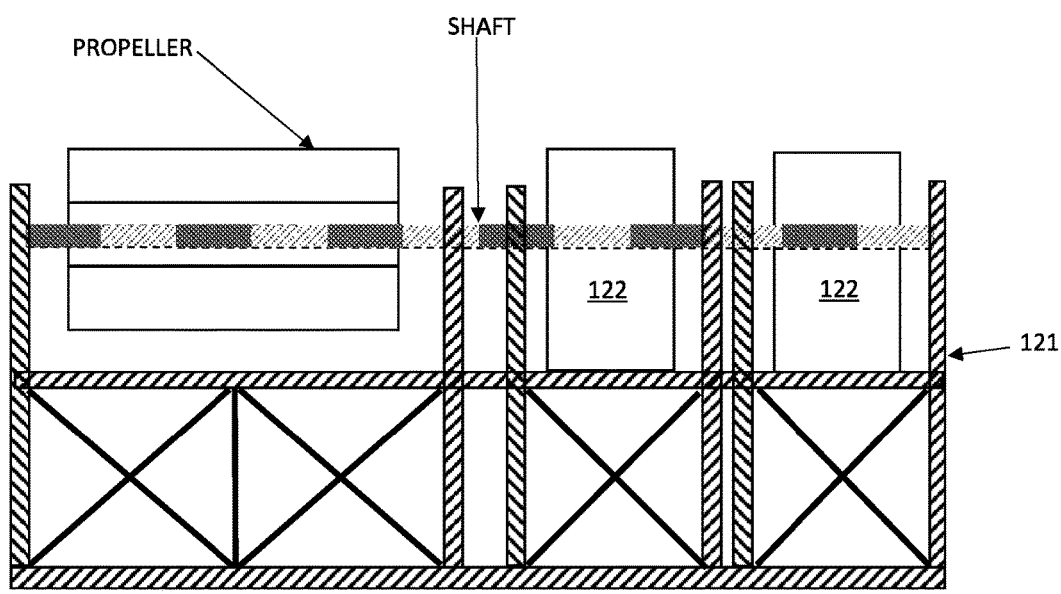
FIG. 3 presents a cross-sectional view of a portion of the invention showing the ramp, water turbine, and generators according to an embodiment of the present invention.

Referring now to FIG. 3, there is shown a cross-sectional view of the generator component 120. The generator component 120 is comprised of a ramp 121, or sluice 121e, and a one or more electrical generator 122. The ramp 121 is comprised of a structure having an inclined top surface 121a, with a first end 121b higher than a second end 121c, and a support system 121d below the top surface, where the support system is configured to maintain the top surface 121a above the water level. This may be accomplished through fixed structures or buoyancy apparatus that allow the ramp to float on the water's surface. The top surface 121a of the ramp is configured to collect the water flow as it exits the pipe outlet, and direct that water flow to a one or more electrical generator 122.

In operational communication with the top surface 121a of the ramp 121, a one or more electrical generator 122 are operatively communicative with the water flow via a hydraulic turbine with propeller blades as shown in FIG. 3 or water wheels as shown in FIG. 1 and FIG. 2. Each electrical generator is further operatively communicative with the electronics and control component.

The Electronics and Control Component 130.

The electronics and control component 130 comprises a one or more processor, a logic operator, and a power regulator. The electronics and control components 130 can be realized each as one or more computing devices, executing a variety of scripts, databases, processes, and related components. One with knowledge in the art will appreciate that the components may represent all hardware components, all software components, or a combination of hardware and software components. Further embodiments of the system are configured to place the electronics and control component 130 as a node on a local area network, or as a node accessible via a wide area network, or even the Internet.

In one embodiment, the electronics and control component 130 comprises a physical computing device configured with network connectivity, such as Ethernet IEEE 802.3, Wireless such as IEEE 802.11, Bluetooth, ZigBee, or Cellular Wireless such as GSM. Such dedicated computing device further comprises a microprocessor device which communicates with an input/output subsystem, memory, storage and network interface. The microprocessor device is operably coupled with a communication infrastructure herein represented as a bus that is a simplified representation of the communication infrastructure required in a device of this type.

The microprocessor device may be a general or special purpose microprocessor operating under control of computer program instructions executed from memory on program data. The microprocessor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

Memory may include both volatile and persistent memory for the storage of: operational instructions for execution by Microprocessor, data registers, application storage and the like. The computer instructions/applications that are stored in memory are executed by processor. The I/O subsystem of the electronics and control component 130 may comprise various end user interfaces such as a display, a keyboard, and a mouse. The I/O subsystem comprises a data network interface. The network interface allows software and data to be transferred between the electronics and control component and external hosts or devices. Examples of network interface can include one or a plurality of: Ethernet network interface card, wireless network interface card, network interface adapter via USB, wireless cellular modem, and the like. Data transferred via network interface are in the form of signals which may be, for example, electronic, electromagnetic, radio frequency, optical, or other signals capable of being transmitted or received by network interface.

Generally, the electronics and control component 130 monitors, via the one or more flow sensors, the water flow through the pipe and regulates the opening and closing of the inlet and outlet covers, as well as the functioning of the one or more pump, in order to maintain a predetermined flow of water through the electrical generator component.

In other embodiments, as described above, the electronics and control component 130 may alternatively, or additionally, monitor one or more pressure sensors and, based upon data collected and analyzed, regulate the opening and closing of the inlet and outlet covers, as well as the functioning of the one or more pump.

In operation, the electronics and control component 130, upon sensing, via a flow sensor, a predetermined "low" flowrate, will close both the sealed inlet cover and the sealed outlet cover. The electronics and control component 130 will then power on the pump to create a vacuum within the sealed pipe. The electronics and control component 130 then opens the outlet cover. The combination of the vacuum created within the pipe, along with the hydrostatic pressure exerted by the water at the pipe inlet, causes the water to rush into the pipe.

When the electronics and control component 130 senses, via a flow sensor, a predetermined "low" flowrate, it closes the inlet cover. In this way, a column of water is introduced into the pipe. Should the column of water now in the pipe not be sufficient to exit the pipe outlet onto the ramp, the electronics and control component 130 can activate the pump to again create a vacuum above the column of water and run the above cycle again. The one or more one-way valve assists the efficiency of the system by preventing back flow. When a flow rate sensor determines that the column of water has reached the outlet, it opens the outlet cover so that the water can spill out. When a flow rate sensor detects again a "low" flow, the electronics and control component closes the covers and repeats the pumping procedure to increase the flow rate again.

A water pump 119, as shown in FIG. 4, located in-line with the water flow within the pipe 111, and below the level of the water W outside of the pipe 111, may be incorporated into the siphoning component 110 in order to facilitate water flow up the pipe 111.

As described previously, the electronics and control component 130 may also receive pressure readings outside of the inlet at depth D, and compare those pressure readings to the pressure readings inside the pipe 111 at the outlet. Since water W will flow from an area of higher pressure to an area of lower pressure, the electronics and control component 130 may be configured such that, when the pressure reading inside the pipe 111 at the outlet is sufficiently lower that the pressure reading outside the pipe 111 at depth D (such as due to the vacuum created inside the pipe 111 as described above), the electronics and control component 130 opens the inlet cover (maintaining closed the outlet cover) and allows the water W to enter the pipe 111.

When the pressure reading inside the pipe 111 at the outlet is substantially equal to the pressure reading outside the pipe 111 at depth D, the electronics and control component 130 closes the inlet cover. The vacuum then begins to operate again, until the desired pressure differential is achieved and the inlet cover may be opened and closed again as described. This cycle is continued until the electronics and control component 130 receives sensor data that indicates that water has filled the pipe 111 and is now accumulated at outlet 113. The electronics and control component 130 opens the outlet cover and allows the accumulated water to flow out of the pipe 111. When the flow rate of the water out of the pipe 111 has slowed to a predetermined rate, the outlet cover is closed and the cycle to siphon the water up the pipe 111 begins again.

The electronics and control component 130 is powered by, and delivers electrical power to, the various sub-components such as the pump, the sensors, and the covers from a power regulator, further comprising a power source. Embodiments of the invention include a power source 160 (as shown in FIG. 4) that is a rechargeable battery. Other embodiments contemplate the use of renewable energy generating sources such as solar panels 140 or wind turbines 150 connected to battery stores for the power source 160. Other forms of renewable energy may capture ocean currents to generate electricity as the power source. Yet further embodiments contemplate that the power source may be in the form of an initially charged battery that is recharged by capturing a portion of the hydroelectric power generated by the system.

The electricity generated by the system may be transmitted to another location via power lines, or stored in batteries, or other electricity storage and transmission apparatus as may be known in the art.

It is contemplated to be within the scope and spirit of this invention that systems, as described herein, may be deployed throughout the world, wherever electrical power is needed. Embodiments of the invention may be scaled according to need, and multiple systems may be combined to generate more power. Components from one embodiment may be used in other embodiments.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in the claims presented.

The appended drawings and figures illustrate various embodiments of the present invention. It is contemplated that various other embodiments of the present invention may be within the scope of what has been disclosed herein even though it may not be shown in the embodiments depicted in the appended drawings and figures.

Therefore, while there has been described what is presently considered to be the preferred embodiment, it will be understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described herein.

The invention claimed is:

1. A battery replenishing system comprising:
   a pipe partially submerged in the body of water, the pipe comprising:
      an inlet portion comprising an inlet submerged in the body of water;
      an outlet portion comprising a downward angled outlet portion with an outlet, the downward angled outlet portion disposed above a surface of the body of water;
      a substantially vertical portion extending between the inlet portion and the outlet portion;
      an inlet cover sealably communicative with the inlet; and
      an outlet cover sealably communicative with the outlet;
   a pump sealably communicative with an interior of the pipe in a submerged portion of the pipe;
   at least one flow-rate sensor disposed within the pipe and sensing a rate of water flow through the pipe; and
   at least one directional flow valve disposed integral to the pipe between the inlet and the outlet, the at least one directional flow valve preventing backflow of water through the pipe; and
   a generator component having at least one turbine in proximity with the outlet portion of the pipe, comprising:
      a ramp with an inclined top surface having a first end higher than a second end and a support system fixedly attached below the top surface, wherein the support system is configured to maintain the top surface above the surface of the body of water and wherein the downward angled outlet portion of the pipe is positioned so that the water exiting the pipe is directed at the first end and directed towards a sluice where the sluice is configured between the outlet portion and the at least one turbine of the generator component;
      at least one electrical generator mounted in fixed relation to the ramp, operatively communicative with the water as it flows down the sluice and the top surface of the ramp; and
   an electronics and control component coupled to the pipe and the at least one electrical generator, the electronics and control component comprising a processor, a logic circuit, a power regulator, and a power source in the form of a rechargeable battery and at least one renewable energy generating source providing power to the pump, the inlet cover, and the outlet cover, wherein the processor executes instructions comprising:
      monitoring, via the at least one flow-rate sensor, the water flow through the pipe in order to reach a predetermined flow rate of water through the pipe;
      determining that a flow rate of the water through the pipe is below the preselected flow rate; and
      responsive to determining that the flow rate is below the preselected flow rate, performing a cycle of:
         selectively closing and opening the inlet and outlet covers, thereby sealing and opening the pipe as the at least one flow-rate sensor is monitored;
         activating, powering, and regulating the pump using energy from the generator component and the power source;
         repeating the cycle until water has accumulated at said outlet portion and the sluice whereupon gravity causes the water to flow down the ramp, interacting with the at least one electrical generator, thus generating electricity.

2. The battery replenishing system of claim 1 wherein the inlet portion is substantially horizontal.

3. The battery replenishing system of claim 1 wherein the at least one directional flow valve is disposed in the inlet portion.

4. The battery replenishing system of claim 1 wherein the at least one directional flow valve is disposed in the substantially vertical portion of the pipe.

5. The battery replenishing system of claim 1 wherein the inlet cover and the outlet cover are configured with an opening and closing mechanism selected from a group consisting of: an electric motor, a servo, a pneumatic mechanism, and a hydraulic mechanism.

6. The battery replenishing system of claim 1 wherein the inlet cover and the outlet cover comprise mechanical sealing devices selected from a group consisting of: rotatable ball valves, butterfly valves, gate valves, and a knife gate valve.

7. The battery replenishing system of claim 1 wherein the at least one electrical generator is at least one of a hydraulic turbine or a water wheel.

8. The battery replenishing system of claim 1 wherein the at least one flow rate sensor measures and detects the flow rate of the water exiting the pipe, the electronics and control component selectively opens and closes the inlet cover and the outlet cover and is further configured to control the pump to maintain the preselected flow rate.

9. The battery replenishing system of claim 1 wherein the support system uses a fixed structure to maintain the top surface of the ramp above the surface of the water.

10. The battery replenishing system of claim 1 wherein the support system uses a buoyancy apparatus that allows the ramp to float on the surface of the water.

11. The battery replenishing system of claim 1 wherein the top surface of the ramp is configured to collect the water flow as it exits the outlet and direct the water flow to the at least one electrical generator.

12. The battery replenishing system of claim 1 wherein the power source comprises an initially charged battery that is subsequently recharged by capturing a portion of the hydroelectric power generated by the hydroelectric system and by capturing energy from the renewable energy generating source in the form of a solar panel or wind turbine or both.

13. The battery replenishing system of claim 1 wherein the energy applied to the pump from the generator portion and the renewable energy generating source and the hydrostatic pressure exerted by water at the pipe inlet causes water to rush into and out of the pipe.

14. The battery replenishing system of claim 1 wherein the pump along with, and aided by, hydrostatic pressure exerted by water at depth causes the pipe to be filed with water.

15. The battery replenishing system of claim 1 wherein the pump is a water pump disposed on the substantially vertical portion of the pipe, below the level of the surrounding water.

16. The battery replenishing system of claim 1 further comprising a pressure sensor, operatively communicative with the electronics and control component, located outside of the pipe at a depth level with the inlet portion.

17. The battery replenishing system of claim 1 further comprising a pressure sensor, operatively communicative with the electronics and control component, located inside of the pipe at the outlet portion.

18. The battery replenishing system of claim 1 further comprising logic configured to compare a first pressure measured outside of the pipe at the inlet portion and a second pressure measured inside of the pipe at the outlet portion, whereby when the second pressure is less than the first pressure by a predetermined amount, said inlet cover is opened and said outlet cover is closed, and when the second pressure is substantially equal to the first pressure, said inlet cover is closed.

19. The battery replenishing system of claim 1 further configured to determine when water has accumulated in the outlet portion and wherein the pipe and the pump are configured to initially create a vacuum inside the pipe and draw water up the pipe.

20. A battery replenishing system comprising:
   a pipe partially submerged in a body of water and partially configured for drawing water from the body of water using a hydrostatic pressure differential, the pipe comprising:
      an inlet portion comprising an inlet submerged in the body of water;
      an outlet portion comprising a downward angled outlet portion with an outlet, the downward angled outlet portion disposed above a surface of the body of water;
      a substantially vertical portion extending between the inlet portion and the outlet portion;
      an inlet cover sealably communicative with the inlet; and
      an outlet cover sealably communicative with the outlet;
      a pump sealably communicative with an interior of the pipe in a submerged portion of the pipe;
   at least one flow-rate sensor disposed within the pipe and sensing a rate of water flow through the pipe; and
   at least one directional flow valve disposed integral to the pipe between the inlet and the outlet, the at least one directional flow valve preventing backflow of water through the pipe; and
   a generator component having at least one turbine in proximity with the outlet portion of the pipe, comprising:
      a ramp with an inclined top surface having a first end higher than a second end and a support system fixedly attached below the top surface, wherein the support system is configured to maintain the top surface above the surface of the body of water and wherein the downward angled outlet portion of the pipe is positioned so that the water exiting the pipe is directed at the first end and directed towards a sluice where the sluice is configured between the outlet portion and the at least one turbine of the generator component;
   a renewable energy generating source in the form of a solar panel or a wind turbine or both coupled to a rechargeable battery for at least partially powering the pump;
   at least one electrical generator mounted in fixed relation to the ramp, operatively communicative with the water as it flows down the top surface of the ramp and wherein energy is stored from the electrical generator and the renewable energy generating source in the rechargeable battery; and
   an electronics and control component coupled to the pipe and the at least one electrical generator, the electronics and control component comprising a processor, a logic circuit, a power regulator, wherein the rechargeable battery serves as a power source to the pump and wherein the processor executes instructions comprising:
      monitoring, via the at least one flow-rate sensor, the water flow through the pipe in order to reach a predetermined flow rate of water through the pipe;
      responsive to determining that the flow rate falls below the preselected flow rate, performing a cycle of:
         selectively closing and opening the inlet and outlet covers, thereby sealing and opening the pipe as the at least one flow-rate sensor is monitored;
         activating, powering, and regulating the pump using at least stored energy from the rechargeable battery; and
         wherein said cycle is repeated until water has accumulated at said outlet portion and the sluice whereupon gravity causes the water to flow down the ramp, interacting with the at least one electrical generator, thus generating electricity to replenish the rechargeable battery.

* * * * *